United States Patent [19]
Wong

[11] Patent Number: 5,844,827
[45] Date of Patent: Dec. 1, 1998

[54] ARITHMETIC SHIFTER THAT PERFORMS MULTIPLY/DIVIDE BY TWO TO THE NTH POWER FOR POSITIVE AND NEGATIVE N

[75] Inventor: Roney S. Wong, Sunnyvale, Calif.

[73] Assignee: Samsung Electronics Co., Ltd., Rep. of Korea

[21] Appl. No.: 731,654

[22] Filed: Oct. 17, 1996

[51] Int. Cl.$^6$ ...................................................... G06F 7/00
[52] U.S. Cl. ................................ 364/715.08; 364/715.04; 364/748.01; 364/748.09; 364/748.11; 364/754.01; 364/760.01; 395/565
[58] Field of Search ..................... 364/715.08, 760.01, 364/754.01, 748.01, 748.09, 748.11, 715.04; 395/565

[56] References Cited

U.S. PATENT DOCUMENTS

| | | | |
|---|---|---|---|
| 4,218,751 | 8/1980 | McManigal | 364/784 |
| 4,931,970 | 6/1990 | Cook et al. | 364/715.08 |
| 5,282,153 | 1/1994 | Bartkowiak et al. | 364/716 |
| 5,373,459 | 12/1994 | Taniguchi | 364/715.01 |
| 5,442,576 | 8/1995 | Gergen et al. | 364/715.08 |
| 5,555,202 | 9/1996 | Chu | 364/715.08 |
| 5,574,672 | 11/1996 | Briggs | 364/715.08 |

OTHER PUBLICATIONS

"Programming The 80386" by Crawford et al., published by SYBEX Inc., 1987, pp. 241–244 and 405–406.

"Computer Arithmetic Systems: Algorithms, Architecture and Implementations" by A. Omondi, published by Prentice Hall International (UK) Limited, 1994, pp. 505–513.

*Primary Examiner*—Reba I. Elmore
*Assistant Examiner*—McDieunel Marc
*Attorney, Agent, or Firm*—Skjerven, Morrill, MacPherson, Franklin & Friel, LLP; David M. Sigmond

[57] ABSTRACT

A method and apparatus in accordance with the present invention provides for multiplying and/or dividing an operand by $2^N$ using an arithmetic shifter where N is an integer represented in 2's complement form. The invention multiplies an operand by $2^N$ by left-shifting the operand by N bit positions when N is positive and right-shifting the operand by the absolute value of N bit positions when N is negative, and divides an operand by $2^N$ by right-shifting the operand by N bit positions when N is positive and left-shifting the operand by the absolute value of N bit positions when N is negative.

70 Claims, 6 Drawing Sheets

ARITHMETIC SHIFTER THAT PERFORMS MULTIPLY/DIVIDE BY TWO TO THE NTH POWER FOR POSITIVE AND NEGATIVE N

BACKGROUND OF THE INVENTION

1. Field of the Invention

The present invention relates to computer arithmetic, and more particularly to multiplication and division by $2^N$ where N is a signed integer.

2. Description of Related Art

Arithmetic shifters are used for fast multiplication and division by $2^N$ where N is an unsigned integer. Such shifters exploit the fact the operands represented in binary form are composed of bit positions that differ by powers of two. For instance, the bit positions of a four-bit unsigned binary operand typically represent $2^3$, $2^2$, $2^1$ and $2^0$. Therefore, when multiplication is selected the operand is left-shifted by N bit positions, and when division is selected the operand is right-shifted by N bit positions. The arithmetic shifter is usually not large enough to store the entire shifted operand. Consequently, operand bits are often shifted-out and discarded, and the result is not always numerically correct.

A typical drawback of such shifters is that N must be an unsigned number. See, for instance, "Programming The 80386" by Crawford et al., published by SYBEX Inc., 1987, pp. 241–244 and 405–406, which describes SAL (shift arithmetic left) and SAR (shift arithmetic right) integer instructions. In both SAL and SAR, the operand to be shifted is $op_1$, the shift count is specified in $op_2$, and the result is stored in $op_1$. The shift count is masked to 5 bits, and shifts of 0 to 31 bits are performed. With SAL, $op_1$ is left-shifted by the shift count and the low-order bits are filled with zero's. With SAR, $op_1$ is right-shifted by the shift count and the high-order bits are filled with the sign bit of $op_1$. SAL and SAR can be used to rapidly multiply and divide an operand by $2^N$ when N is an unsigned integer. However, neither SAL nor SAR recognize negative shift counts.

Signed binary numbers are usually represented in computers using four systems: sign-magnitude, 2's complement, 1's complement, and biased. Of these systems, 2's complement is the most popular due to the ease of implementing addition and subtraction.

Accordingly, a need exists for an arithmetic shifter that multiplies and/or divides an operand by $2^N$, where N is an integer represented in 2's complement form, in a rapid and efficient manner.

SUMMARY OF THE INVENTION

A method and apparatus in accordance with the present invention advantageously provides for multiplying and/or dividing an operand by $2^N$ using an arithmetic shifter where N is an integer represented in 2's complement form.

Broadly speaking, the invention multiplies an operand by $2^N$ by left-shifting the operand by N bit positions when N is positive and right-shifting the operand by the absolute value of N bit positions when N is negative, and the invention divides an operand by $2^N$ by right-shifting the operand by N bit positions when N is positive and left-shifting the operand by the absolute value of N bit positions when N is negative.

In a first embodiment of the invention, an arithmetic left/right shifter receives the operand and provides the result. The absolute value of N provides the shift count for the shifter, and the sign bit of N and a function signal, indicative of whether multiply or divide is selected, provide the shift direction for the shifter. The shifter left-shifts the operand by the absolute value of N bit positions when multiply is selected and N is positive, and when divide is selected and N is negative. The shifter right-shifts the operand by the absolute value of N bit positions when multiply is selected and N is negative, and when divide is selected and N is positive.

In a second embodiment of the invention, a first arithmetic left/right shifter receives the operand, the first shifter output provides an operand input for a second arithmetic left/right shifter, and the second shifter provides the result. N provides the shift count for the first shifter when N is positive, and the bit-complement of N provides the shift count for the first shifter when N is negative. The sign bit of N and the function signal provide the shift direction for the first shifter, the sign bit of N provides the shift count for the second shifter, and the function signal provides the shift direction for the second shifter. The first shifter left-shifts the operand by N bit positions and the second shifter does not shift the first shifter output when multiply is selected and N is positive. The first shifter right-shifts the operand by N bit positions and the second shifter does not shift the first shifter output when divide is selected and N is positive. The first shifter right-shifts the operand by the absolute value of N minus one bit positions and the second shifter right-shifts the first shifter output by one bit position when multiply is selected and N is negative. The first shifter left-shifts the operand by the absolute value of N minus one bit positions and the second shifter left-shifts the first shifter output by one bit position when divide is selected and N is negative.

A feature of the invention is a range detector which generates an overflow or underflow signal when the value of N exceeds a maximum shift count of the shifter that receives the operand. For instance, in the first embodiment, the range detector receives the absolute value of N, which is composed of high-order and low-order bits, provides the shift count as the low-order bits, provides the overflow signal when any of the high-order bits is a one and the shifter left-shifts the operand, and provides the underflow signal when any of the high-order bits is a one and the shifter right-shifts the operand. In the second embodiment, the range detector receives the multiplexer output, which is composed of high-order and low-order bits, provides the shift count to the first shifter as the low-order bits, provides the overflow signal when any of the high-order bits is a one and the first shifter left-shifts the operand and also when all the low-order bits are one's and the second shifter left-shifts the first shifter output, and provides the underflow signal when any of the high-order bits is a one and the first shifter right-shifts the operand and also when all the low-order bits are one's and the second shifter right-shifts the first shifter output.

Another feature of the invention is the provision of a multiplier, a divider, or a multiplier and divider in combination.

These and other aspects, features and advantages of the invention will be further described and more readily apparent from a review of the detailed description of the preferred embodiments which follows.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

The present invention multiplies and/or divides an operand by $2^N$ where N is an integer represented in 2's complement form. Determining whether N is positive or negative is accomplished by inspecting its most significant bit (MSB). For positive N the MSB (or sign bit) is a zero, whereas for negative N the MSB is a one. Thus, positive N includes zero. Bit-complementing is equivalent to a 1's complement operation. Since N is represented in 2's complement form, the negative of N is provided by incrementing the bit-complement of N. Therefore, when N is negative, incrementing the bit-complement of N provides the absolute value of N. Likewise, when N is negative, the bit-complement of N provides the absolute value of N minus one.

Figure 1:
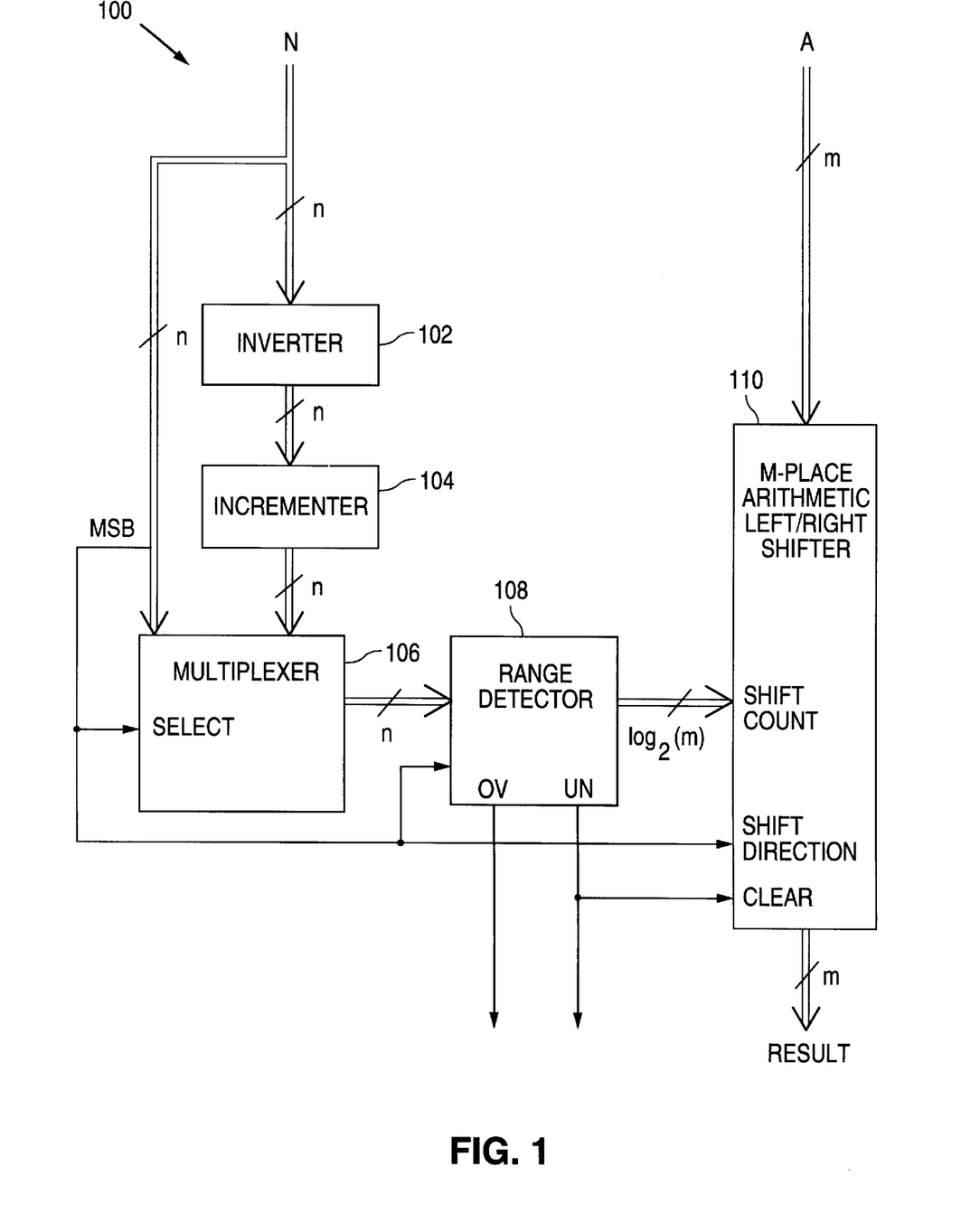
FIG. 1 is a block diagram of a multiplier in accordance with a first embodiment of the invention.
Figure 2:
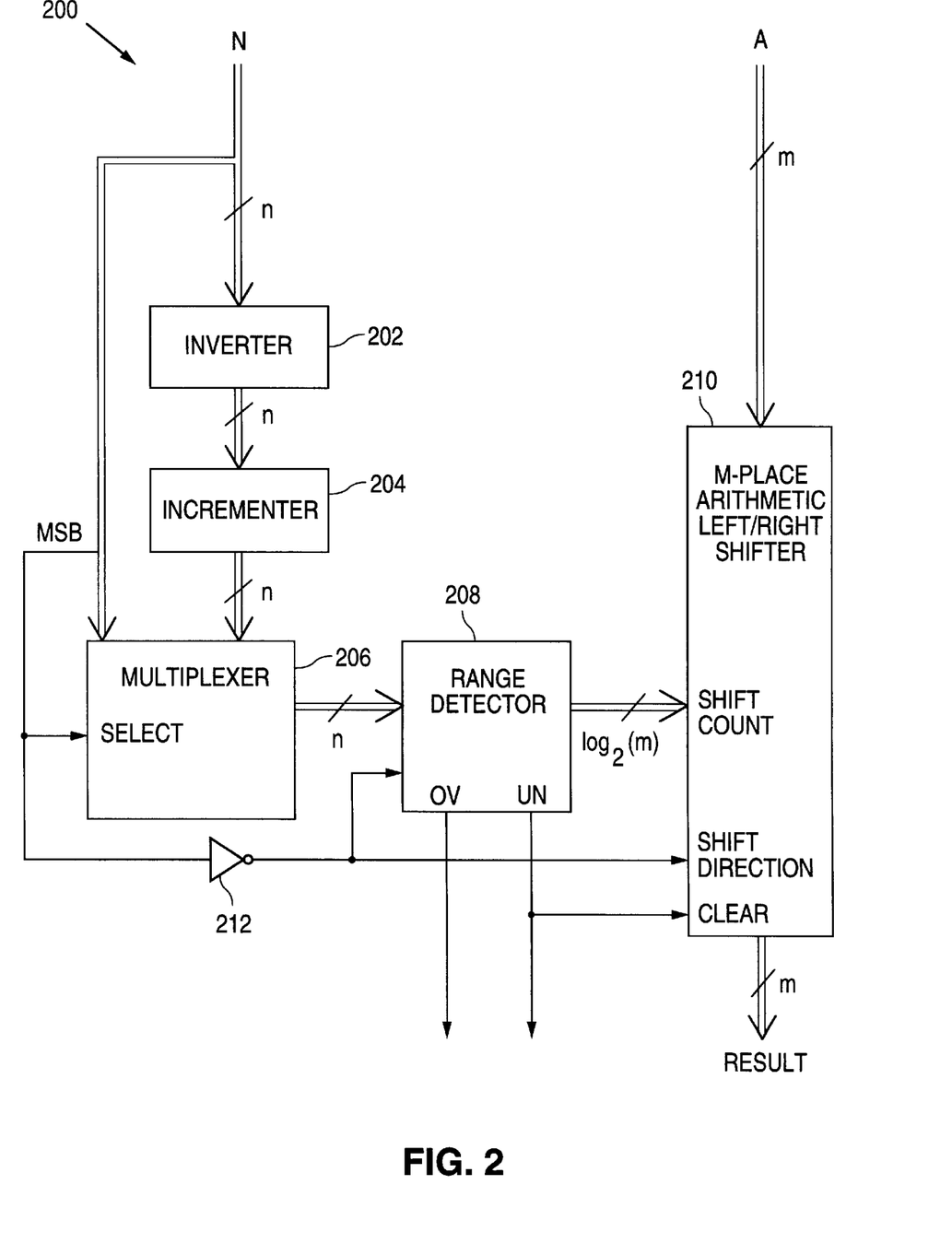
FIG. 2 is a block diagram of a divider in accordance with a first embodiment of the invention.
Figure 3:
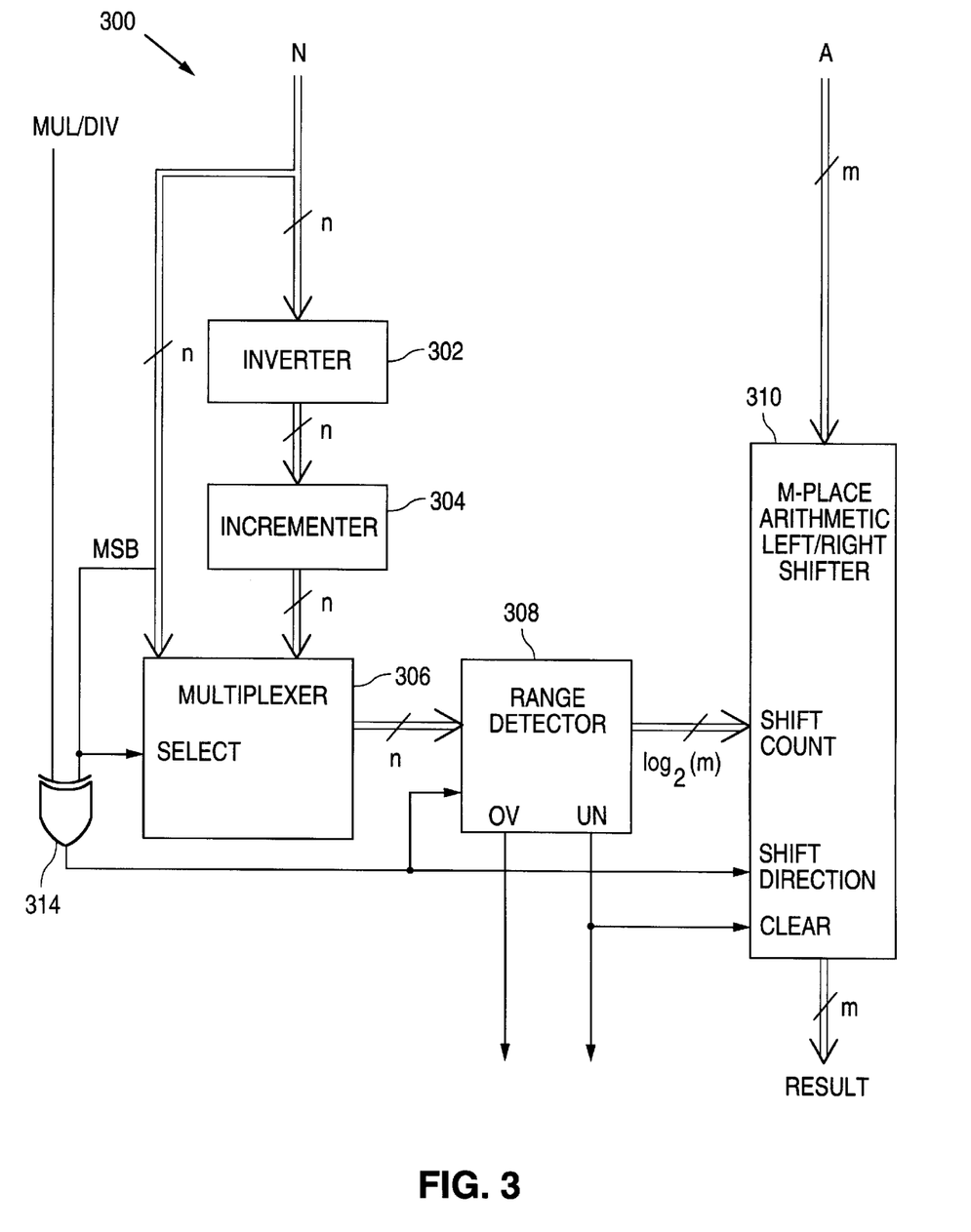
FIG. 3 is a block diagram of a multiplier/divider in accordance with a first embodiment of the invention.

FIGS. 1–3 illustrate a multiplier, divider, and multiplier/divider in accordance with a first embodiment of the invention. The operand to be multiplied or divided by $2^N$ is applied to an arithmetic left/right shifter, the absolute value of N provides a shift count for the shifter, and the shift direction for the shifter is a function of the operation (multiply or divide) and the sign bit of N.

In FIG. 1, logic circuit 100 multiplies A by $2^N$ where A is an m-bit operand and N is an n-bit integer represented in 2's complement form. Logic circuit 100 includes inverter 102, incrementer 104, multiplexer 106, range detector 108, and m-place arithmetic left/right shifter 110. N is applied to inverter 102, which generates the bit-complement of N. Inverter 102 can be implemented by separate binary inverters for each bit of N. The bit-complement of N is applied to incrementer 104, which increments the bit-complement of N. Incrementer 104 can be implemented by a carry lookahead adder which receives the bit-complement of N at a first operand input, and one at a second operand input. Alternatively, the carry lookahead adder can receive zero at its second operand input, and receive a carry-in bit set to one at the least significant bit (LSB) position of its carry chain. Multiplexer 106 receives N at a first operand input, the bit-complement of N incremented by one from incrementer 104 at a second operand input, and the sign bit of N at a select input. Multiplexer 106 is a conventional 2:1 multiplexer that selects the first operand input thereof when the select input receives a zero, and selects the second operand input thereof when the select input receives a one. Therefore, multiplexer 106 provides N at the multiplexer output when N is positive, and provides the bit-complement of N incremented by one at the multiplexer output when N is negative. As a result, the combination of inverter 102, incrementer 104 and multiplexer 106 provide the absolute value of N at the multiplexer output for all values of N.

Range detector 108 receives the absolute value of N from multiplexer 106. The absolute value of N is composed of n bits that consist of high-order and low-order bits. By definition, the high-order bits are a string of adjacent bits that include the MSB, the low-order bits are a string of adjacent bits that include the LSB, and the least significant high-order bit is adjacent to the most significant low-order bit. A is an m-bit operand, and shifter 110 is an m-place shifter with a maximum shift count of m−1. Therefore, shifter 110 accepts a shift count signal with $\log_2(m)$ bits at its shift count input. Accordingly, range detector 108 generates a shift count signal of $\log_2(m)$ bits, which happen to be the low-order bits of the absolute value of N.

Suppose, for example, that N is a 16-bit word, A is a 32-bit word, and shifter 110 is a 32-place shifter with a maximum shift count of 31. In this instance, shift counts of 0 to 31 are within the maximum shift count, and the maximum number of bits that shifter 110 accepts at its shift count input is $\log_2(32)$, or 5 bits. As a result, the absolute value of N consists of 11 high-order bits (at bit positions $2^{15}$ to $2^5$) and 5 low-order bits (at bit positions $2^4$ to $2^0$). Range detector 108 transfers the 5 low-order bits as the shift count signal to shifter 110.

Range detector 108 also receives the sign bit of N and provides overflow and underflow signals. When N is positive and the value of N exceeds the maximum shift count of shifter 110, then overflow occurs since shifter 110 cannot provide a large enough left-shift, and range detector 108 sets signal OV to a one. Likewise, when N is negative and the value of the absolute value of N exceeds the maximum shift count of shifter 110, then underflow occurs since shifter 110 cannot provide a large enough right-shift, and range detector 108 sets signal UN to a one. Range detector 108 generates signal OV when the sign bit of N is a zero and any of the high-order bits is a one, and range detector 108 generates signal UN when the sign bit of N is a one and any of the high-order bits is a one.

Range detector 108 can be implemented using simple combinatorial logic. For instance, the high-order bits of the absolute value of N can be applied to an OR gate, the output of the OR gate and the bit-complement of the sign bit of N can be applied to a first AND gate, and the output of the OR gate and the sign bit of N can be applied to a second AND gate. In this manner, the first AND gate generates signal OV as a one only when N is positive and at least one of the high-order bits is a one, and the second AND gate generates signal UN as a one only when N is negative and at least one of the high-order bits is a one. Furthermore, since the MSB (or sign bit) of the absolute value of N is always a zero, this bit need not be applied to the OR gate. In fact, the sign bit of N need not be applied to inverter 102 or the first operand input of multiplexer 106.

Shifter 110 receives the operand A at an operand input, a shift count signal from range detector 108 at a shift count input, the sign bit of N at a shift direction input, signal UN at a clear. input, and outputs the result. Shifter 1 10 shifts the operand A by the number of bit positions specified at the shift count input. Shifter 110 is capable of shifting by lengths of 0 to m−1 bit positions. Shifter 110 shifts in the direction specified at the shift direction input. Shifter 110 shifts left when a zero is applied at the shift direction input, and shifter 110 shifts right when a one is applied at the shift direction input. When shifter 110 shifts left it inserts a zero (or backfills) at the LSB position of the shifted operand, and when shifter 1 10 shifts right it inserts the sign bit of the operand (or sign-extends the operand) at the MSB position of the shifted operand. Shifter 110 clears its contents (forcing all the bits to zero) when the signal at the clear input is a one.

Shifter 110 is a conventional m-place arithmetic left/right shifter. Therefore, the implementation of shifter 110 is well-known in the art and need not be repeated herein. For instance, shifter 110 can be implemented as a one-level shifter that operates serially (bit-by-bit). Such a shifter is slow since the shift time is proportional to the shift length. Alternatively, where performance rather than cost is the main issue, shifter 110 can be implemented as a multi-level shifter in which parallel shifting is provided using m multiplexers. In this implementation, the shift length controls the multiplexers, and the shift time is determined by the delay through the multiplexers. See, for instance, "Computer Arithmetic Systems: Algorithms, Architecture and Implementations" by A. Omondi, published by Prentice Hall International (UK) Limited, 1994, pp. 505–513.

When N is positive, shifter 110 left-shifts the operand A by the shift count specified in the low-order bits of N, and range detector 108 sets signal OV to a one if any high-order bit of N is a one. When N is negative, shifter 110 right-shifts the operand A by the shift count specified in the low-order bits of the absolute value of N, and range detector 108 sets signal UN to a one thereby clearing shifter 110 if any high-order bit of the absolute value of N is a one.

In FIG. 2, logic circuit 200 divides A by $2^N$ where A is an m-bit operand and N is an n-bit integer represented in 2's complement form. Logic circuit 200 includes inverter 202, incrementer 204, multiplexer 206, range detector 208, m-place arithmetic left/right shifter 210, and inverter 212. Logic circuit 200 is essentially identical to logic circuit 100, except that logic circuit 200 includes inverter 212 that applies the bit-complement of the sign bit of N (rather than applying the sign bit of N) to range detector 208 and shifter 210.

When N is positive, shifter 210 right-shifts the operand A by the shift count specified in the low-order bits of N, and range detector 208 sets signal UN to a one thereby clearing shifter 210 if any high-order bit of N is a one. When N is negative, shifter 210 left-shifts the operand A by the shift count specified in the low-order bits of the absolute value of N, and range detector 208 sets signal OV to a one if any high-order bit of the absolute value of N is a one.

In FIG. 3, logic circuit 300 multiplies or divides A by $2^N$ where A is an m-bit operand and N is an n-bit integer represented in 2's complement form. Logic circuit 300 includes inverter 302, incrementer 304, multiplexer 306, range detector 308, m-place arithmetic left/right shifter 310, and XOR (eXclusive-OR) gate 314. Logic circuit 300 also receives function signal MUL/DIV that specifies the selected operation. When signal MUL/DIV is a zero then multiply is selected, whereas when signal MUL/DIV is a one then divide is selected. Logic circuit 300 is essentially identical to logic circuit 100, except that logic circuit 300 includes XOR gate 314 that receives the sign bit of N and signal MUL/DIV and applies a control signal (rather than the sign bit of N) to range detector 308 and shifter 310.

When N is positive and multiply is selected, or when N is negative and divide is selected, the control signal is a zero, shifter 310 left-shifts the operand A by the shift count specified in the low-order bits of the absolute value of N, and range detector 308 sets signal OV to a one if any high-order bit of the absolute value of N is a one. When N is negative and multiply is selected, or when N is positive and divide is selected, the control signal is a one, shifter 310 right-shifts the operand A by the shift count specified in the low-order bits of the absolute value of N, and range detector 308 sets signal UN to a one thereby clearing shifter 310 if any high-order bit of the absolute value of N is a one.

Figure 4:
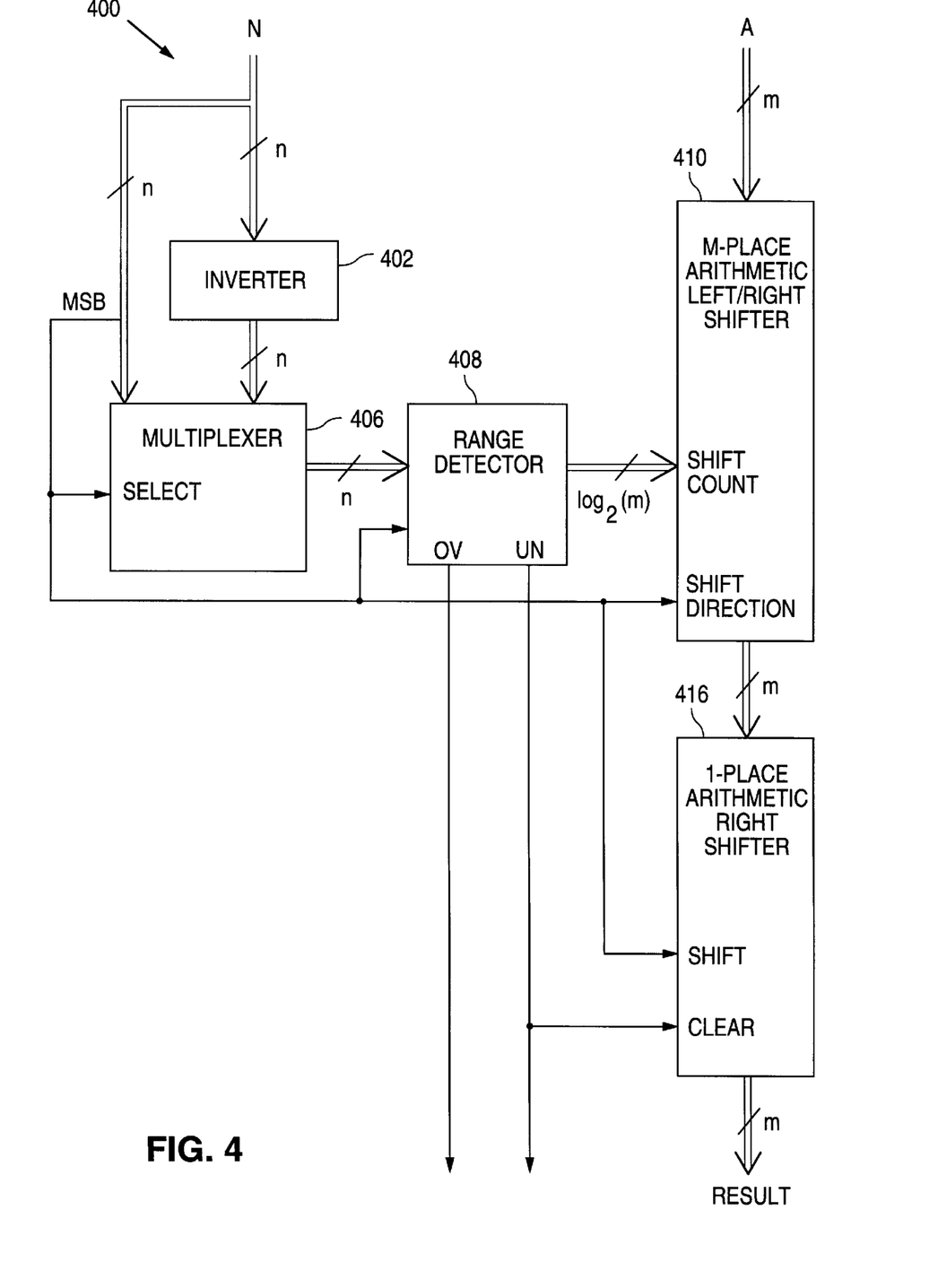
FIG. 4 is a block diagram of a multiplier in accordance with a second embodiment of the invention.
Figure 5:
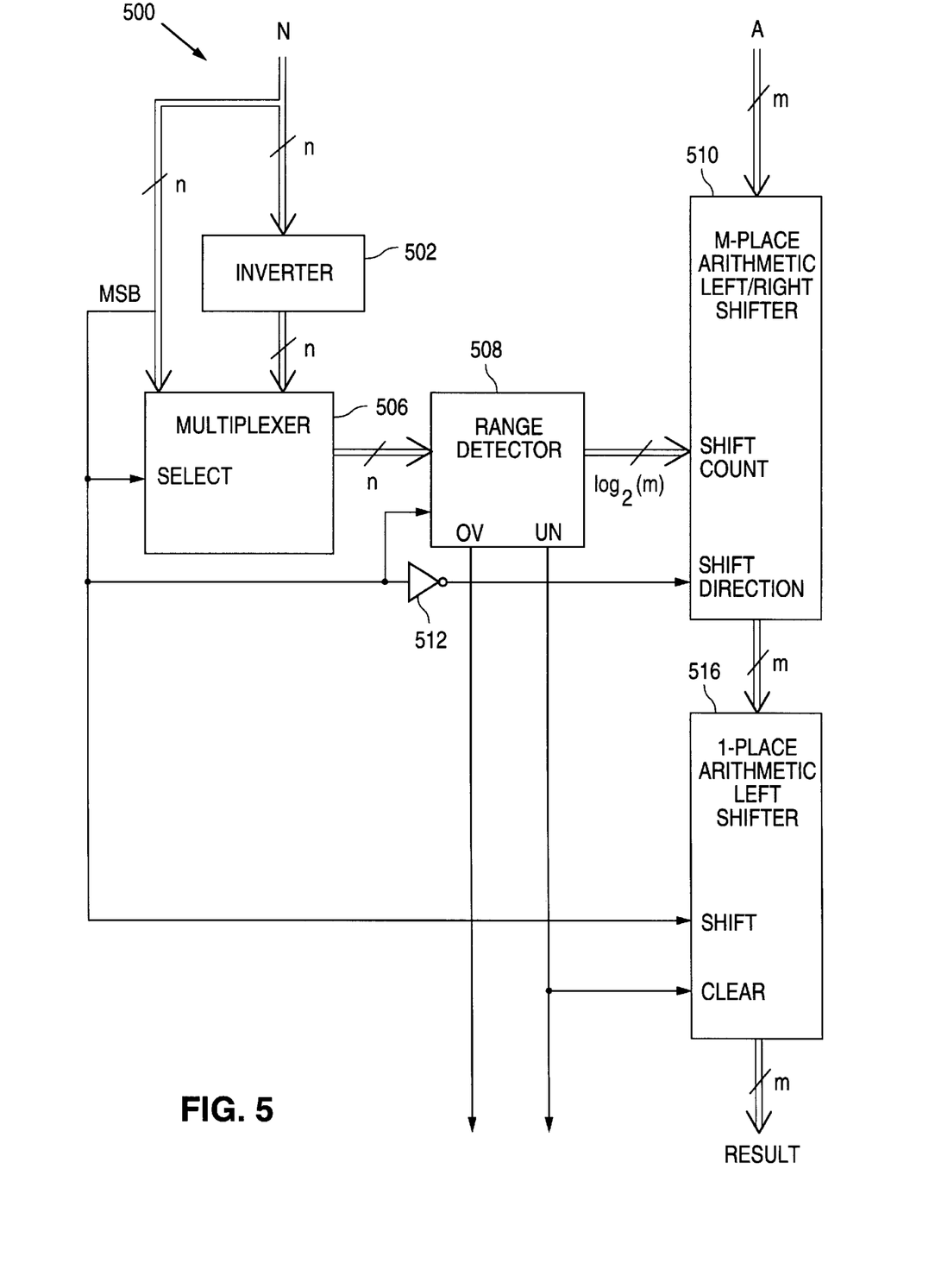
FIG. 5 is a block diagram of a divider in accordance with a second embodiment of the invention.
Figure 6:
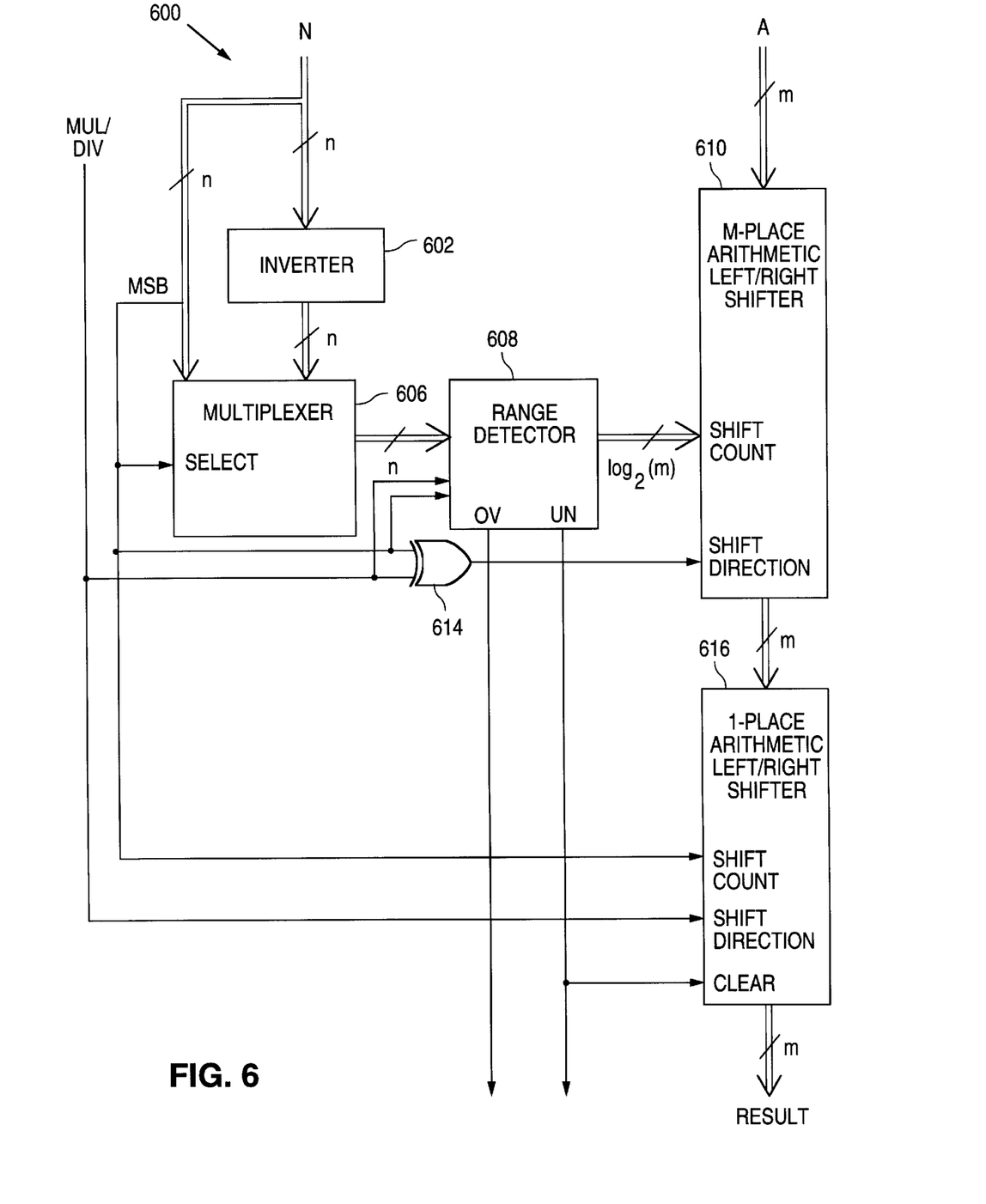
FIG. 6 is a block diagram of a multiplier/divider in accordance with a second embodiment of the invention.

FIGS. 4–6 illustrate a multiplier, divider, and multiplier/divider in accordance with a second embodiment of the invention. The operand to be multiplied or divided by $2^N$ is applied to a first arithmetic left/right shifter, an output of the first shifter provides an operand input for a second arithmetic shifter, a multiplexer which selects between N and the bit-complement of N provides a shift count for the first shifter, the sign bit of N provides the selection input for the multiplexer and the shift count for the second shifter, and the shift direction of both the first and second shifters is a function of the operation (multiply or divide) and the sign bit of N.

The primary difference between the first and second embodiments is that in the first embodiment, when N is negative, the shift count is based on the absolute value of N and the operand A is shifted using a single shifter, whereas in the second embodiment, when N is negative, the shift count of a first shifter is based on the bit-complement of N (or the absolute value of N minus one), the output of the first shifter is applied to a second shifter, and the second shifter shifts the output of the first shifter by one bit position. In this manner, when N is negative, the combination of the first and second shifters shift the operand by the absolute value of N bit positions. An advantage of the first embodiment is that only one shifter is necessary. An advantage of the second embodiment is that the time delays associated with an increment operation are avoided.

In FIG. 4, logic circuit 400 multiplies A by $2^N$ where A is an m-bit operand and N is an n-bit integer represented in 2's complement form. Logic circuit 400 includes inverter 402, multiplexer 406, range detector 408, m-place arithmetic left/right shifter 410, and 1-place arithmetic right shifter 416. Logic circuit 400 is similar to logic circuit 100 in several respects, and therefore much of the discussion pertaining to logic circuit 100 also applies to logic circuit 400. However, logic circuit 400 differs from logic circuit 100 in several key aspects. Logic circuit 400 includes shifter 416 and does not need an incrementer. The output of inverter 402 is applied directly to the second operand input of multiplexer 406. Shifter 416 receives the output of shifter 410 at an operand input, the sign bit of N at a shift input, the underflow signal at a clear input, and outputs the result. Range detector 408 also generates the underflow signal when N is negative and all the low-order bits from multiplexer 406 are one's. The underflow signal need not be applied to shifter 410, which need not include a clear input.

Shifter 416 shifts right by one bit position when a one is applied to its shift input, and does not shift when a zero is applied to its shift input. When shifter 416 shifts right, it inserts the sign bit of the operand at the MSB position of the shifted operand. Shifter 416 clears its contents when the signal at its clear input is a one. Since shifter 416 is a conventional 1-place arithmetic right shifter, the implementation of shifter 416 is well-known in the art and need not be repeated herein. For instance, shifter 416 can be implemented as a 3:1 multiplexer which selects between the output of shifter 410, the output of shifter 410 right-shifted by one bit position with appropriate sign extension, and all zero's.

Range detector 408 generates signal OV when the sign bit of N is a zero and any of the high-order bits from multiplexer 406 is a one, and generates signal UN when the sign bit of N is a one and either any of the high-order bits from multiplexer 406 is a one or all the low-order bits from multiplexer 406 are one's. Range detector 408 can be implemented using simple combinatorial logic. For instance, the high-order bits can be applied to a first OR gate, the output of the first OR gate and the bit-complement of the sign bit of N can be applied to a first AND gate, the low-order bits can be applied to a second AND gate, the output of the first OR gate and the second AND gate can be applied to a second OR gate, and the output of the second OR gate and the sign bit of N can be applied to a third AND gate. In this manner, the first AND gate generates signal OV as a one only when N is positive and at least one of the high-order bits is a one, and the third AND gate generates signal UN as a one only when N is negative and (i) at least one of the high-order bits is a one or (ii) all the low-order bits are one's.

When N is positive, multiplexer 406 selects N, range detector 408 provides the low-order bits of N to the shift count input, shifter 410 left-shifts the operand A by the shift count, and shifter 416 does not shift the output of shifter 410. In addition, range detector 408 sets signal OV to a one if any high-order bit of N is a one. When N is negative, multiplexer 406 selects the bit-complement of N, range detector 408 provides the low-order bits of the bit-complement of N to the shift count input, shifter 410 right-shifts the operand A by the shift count, and shifter 416 right-shifts the output of shifter 410 by one bit position. In addition, range detector 408 sets signal UN to a one thereby clearing shifter 416 if any high-order bit of the bit-complement of N is a one or if all low-order bits of the bit-complement of N are one's.

In FIG. 5, logic circuit 500 divides A by $2^N$ where A is an m-bit operand and N is an n-bit integer represented in 2's complement form. Logic circuit 500 includes inverter 502, multiplexer 506, range detector 508, m-place arithmetic left/right shifter 510, inverter 512, and 1-place arithmetic left shifter 516. Logic circuit 500 is essentially identical to logic circuit 400, except that logic circuit 500 includes inverter 512 that applies the bit-complement of the sign bit of N (rather than applying the sign bit of N) to shifter 510, range detector 508 generates the overflow signal (instead of the underflow signal) when N is negative and all the low-order bits from multiplexer 506 are one's, and shifter 516 is a left shifter instead of a right shifter.

Shifter 516 shifts left by one bit position when a one is applied to its shift input, and does not shift when a zero is applied to its shift input. When shifter 516 shifts left, it inserts a zero into the LSB position of the shifted operand. Shifter 516 clears its contents when the signal at its clear input is a one. Since shifter 516 is a conventional 1-place arithmetic left shifter, the implementation of shifter 516 is well-known in the art and need not be repeated herein. For instance, shifter 516 can be implemented as a 3:1 multiplexer which selects between the output of shifter 510, the output of shifter 510 left-shifted by one bit position with appropriate zero backfilling, and all zero's.

Range detector 508 generates signal OV when the sign bit of N is a one and either any of the high-order bits from multiplexer 506 is a one or all the low-order bits from multiplexer 506 are one's, and generates signal UN when the sign bit of N is a zero and any of the high-order bits from multiplexer 506 is a one. Range detector 508 can be implemented using simple combinatorial logic. For instance, range detector 508 can be implemented in a similar manner to range detector 408 by using the first AND gate to generate signal UN and the third AND gate to generate signal OV. In this manner, the first AND gate generates signal UN as a one only 5 when N is positive and at least one of the high-order bits is a one, and the third AND gate generates signal OV as a one only when N is negative and (i) at least one of the high-order bits is a one or (ii) all the low-order bits are one's.

When N is positive, shifter 510 right-shifts the operand A by the shift count specified in the low-order bits of N, shifter 516 does not shift the output of shifter 510, and range detector 508 sets signal UN to a one thereby clearing shifter 516 if any high-order bit of N is a one. When N is negative, shifter 510 left-shifts the operand A by the shift count specified in the low-order bits of the bit-complement of N, shifter 516 left-shifts the output of shifter 516 by one bit position, and range detector 508 sets signal OV to a one if any high-order bit of the bit-complement of N is a one or if all low-order bits of the bit-complement of N are one's.

In FIG. 6, logic circuit 600 multiplies or divides A by $2^N$ where A is an m-bit operand and N is an n-bit integer represented in 2's complement form. Logic circuit 600 includes inverter 602, multiplexer 606, range detector 608, m-place arithmetic left/right shifter 610, XOR gate 614, and 1-place arithmetic left/right shifter 616. Logic circuit 600 also receives function signal MUL/DIV that specifies the selected operation. When signal MUL/DIV is a zero then multiply is selected, whereas when signal MUL/DIV is a one then divide is selected. Logic circuit 600 is essentially identical to logic circuit 400, except that logic circuit 600 includes XOR gate 614 that receives the sign bit of N and signal MUL/DIV and applies a control signal (rather than the sign bit of N) to shifter 610, both the sign bit of N and signal MUL/DIV are applied to range detector 608, range detector 608 also generates the overflow signal when N is negative and divide is selected and all the low-order bits from multiplexer 606 are one's and generates the underflow signal when N is negative and multiply is selected and all the low-order bits from multiplexer 606 are one's, signal MUL/DIV is applied to a shift direction input of shifter 616, the sign bit of N is applied to a shift count input of shifter 616, and shifter 616 is a left/right shifter instead of a right shifter.

Shifter 616 shifts left by one bit position when a zero is applied to its shift direction input and a one is applied to its shift count input, shifts right by one bit position when a one is applied to it shift direction input and a one is applied to its shift count input, and does not shift when a zero is applied to its shift count input. When shifter 616 shifts left it inserts a zero at the LSB position of the shifted operand, and when shifter 616 shifts right it inserts the sign bit of operand at the MSB position of the shifted operand. Shifter 616 clears its contents when the signal at its clear input is a one. Since shifter 616 is a conventional 1-place arithmetic left/right shifter, the implementation of shifter 616 is well-known in the art and need not be repeated herein. For instance, shifter 616 can be implemented as a 4:1 multiplexer which selects between the output of shifter 610, the output of shifter 610 left-shifted by one bit position with appropriate zero backfilling, the output of shifter 410 right-shifted by one bit position with appropriate sign extension, and all zero's.

Range detector 608 generates signal OV when the sign bit of N is a zero and multiply is selected and any of the high-order bits from multiplexer 606 is a one, and also generates signal OV when the sign bit of N is a one and divide is selected and either any of the high-order bits from multiplexer 606 is a one or all the low-order bits from multiplexer 606 are one's. In addition, range detector 608 generates signal UN when the sign bit of N is a zero and divide is selected and any of the high-order bits from multiplexer 606 is a one, and also generates signal UN when the sign bit of N is a one and multiply is selected and either any of the high-order bits from multiplexer 606 is a one or all the low-order bits from multiplexer 606 are one's.

Range detector 608 can be implemented using simple combinatorial logic. For instance, the high-order bits can be applied to a first OR gate, the low-order bits can be applied to a first AND gate, the outputs of the first OR gate and the first AND gate can be applied to a second OR gate, the bit-complement of the sign bit of N and the bit-complement of signal MUL/DIV and the output of the first OR gate can be applied to a second AND gate, the sign bit of N and signal MUL/DIV and the output of the second OR gate can be applied to a third AND gate, and the outputs of the second and third AND gates can be applied to a third OR gate. Similarly, the bit-complement of the sign bit of N and signal MUL/DIV and the output of the first OR gate can be applied to a fourth AND gate, the sign bit of N and the bit-complement of signal MUL/DIV and the output of the second OR gate can be applied to a fifth AND gate, and the outputs of the fourth and fifth AND gates can be applied to a fourth OR gate. In this manner, the third OR gate generates signal OV as a one only when overflow occurs, and the fourth OR gate generates signal UN as a one only when underflow occurs.

When N is positive and multiply is selected, shifter 610 left-shifts the operand A by the shift count specified in the low-order bits of N, shifter 616 does not shift the output of shifter 610, and range detector 608 sets signal OV to a one if any high-order bit of N is a one. When N is positive and divide is selected, shifter 610 right-shifts the operand A by the shift count specified in the low-order bits of N, shifter 616 does not shift the output of shifter 610, and range detector 608 sets signal UN to a one thereby clearing shifter 616 if any high-order bit of N is a one. When N is negative and multiply is selected, shifter 610 right-shifts the operand A by the shift count specified in the low-order bits of the bit-complement of N, shifter 616 right-shifts the output of shifter 610 by one bit position, and range detector 608 sets signal UN to a one thereby clearing shifter 616 if any high-order bit of the bit-complement of N is a one or if all low-order bits of the bit-complement of N are one's. When N is negative and divide is selected, shifter 610 left-shifts the operand A by the shift count specified in the low-order bits of the bit-complement of N, shifter 616 left-shifts the output of shifter 610 by one bit position, and range detector 608 sets signal OV to a one if any high-order bit of the bit-complement of N is a one or if all low-order bits of the bit-complement of N are one's.

It is understood that coupling a signal to an input, such that the input responds to the signal, includes applying the signal to the input as well as applying a related signal to the input as long as functionality is preserved. For instance, coupling the sign bit of N to a shift direction input of a shifter that shifts left/right when N is positive/negative includes applying the sign bit of N to a shift direction input of a shifter that shifts left/right in response to a zero/one, and includes applying the bit-complement of the sign bit of N to a shift direction input of a shifter that shifts left/right in response to a one/zero.

It is also understood that left-shifting refers to shifting towards the MSB position, and right-shifting refers to shifting towards the LSB position.

Various rounding techniques can be used with the present invention when the operand A is right-shifted. See, for instance, U.S. application Ser. No. 08/731,652, filed concurrently herewith, entitled "Right-Shifting an Integer Operand and Rounding a Fractional Intermediate Result to Obtain a Rounded Integer Result" by R. Wong, which is incorporated herein by reference. Furthermore, various overflow and clamping techniques can be used with the present invention when the operand A is left-shifted. See, for instance, U.S. application Ser, No. 08/731,655, filed concurrently herewith, entitled "Left-Shifting an Integer Operand and Providing a Clamped Integer Result" by R. Wong, which is incorporated herein by reference.

The description of the invention set forth herein is illustrative, and is not intended to limit the scope of the invention as set forth in the following claims. For example, the inverters, incrementers, multiplexers, range detectors and shifters can be implemented in any suitable circuitry. The shifters can provide logical right shifts if unsigned operands are used. A general purpose computer or processor can execute the invention in a single instruction cycle (as is preferred) or multiple instruction cycles. Variations and modifications of the embodiments disclosed herein may be made based on the description set forth herein, without departing from the scope and spirit of the invention as set forth in the following claims.

What is claimed is:

1. A method of operating a circuit to multiply an operand by $2^N$, where N is an integer represented in 2's complement form, and an absolute value of N is within a maximum shift count of an arithmetic left/right shifter, the method comprising the steps of:

left-shifting the operand by N bit positions when N is a positive; and right-shifting the operand by the absolute value of N bit positions when N is negative.

2. The method of claim 1, including:

coupling a sign bit of N to a shift direction input of the arithmetic left/right shifter;

coupling low-order bits of the absolute value of N to a shift count input of the arithmetic left/right shifter;

coupling the operand to an operand input of the arithmetic left/right shifter; and shifting the operand in the arithmetic left/right shifter in a direction defined by the sign bit of N and by a shift count defined by the low-order bits.

3. The method of claim 1, including:

coupling a sign bit of N to a select input of a multiplexer;

coupling N to an operand input of the multiplexer;

providing N at an output of the multiplexer when N is positive and a bit-complement of N at the output of the multiplexer when N is negative;

coupling the sign bit of N to a shift direction input of the arithmetic left/right shifter;

coupling low-order bits of the output of the multiplexer to a shift count input of the arithmetic left/right shifter;

coupling the operand to an operand input of the arithmetic left/right shifter;

shifting the operand in the arithmetic left/right shifter in a direction defined by the sign bit of N and by a shift count defined by the low-order bits;

coupling the sign bit of N to a shift input of an arithmetic right shifter;

coupling an output of the arithmetic left/right shifter to an operand input of the arithmetic right shifter; and right-shifting the output of the arithmetic left/right shifter in the arithmetic right shifter by one bit position when N is negative and not shifting the output of the arithmetic left/right shifter in the arithmetic right shifter when N is positive.

4. A method of operating a circuit to divide an operand by $2^N$, where N is an integer represented in 2's complement form, and an absolute value of N is within a maximum shift count of an arithmetic left/right shifter, the method comprising the steps of:

right-shifting the operand by N bit positions when N is positive; and left-shifting the operand by the absolute value of N bit positions when N is negative.

5. The method of claim 4, including:

coupling a sign bit of N to a shift direction input of the arithmetic left/right shifter;

coupling low-order bits of the absolute value of N to a shift count input of the arithmetic left/right shifter;

coupling the operand to an operand input of the arithmetic left/right shifter; and shifting the operand in the arithmetic left/right shifter in a direction defined by the sign bit of N and by a shift count defined by the low-order bits.

6. The method of claim 4, including:

coupling a sign bit of N to a select input of a multiplexer;

coupling N to an operand input of the multiplexer;

providing N at an output of the multiplexer when N is positive and a bit-complement of N at the output of the multiplexer when N is negative;

coupling the sign bit of N to a shift direction input of the arithmetic left/right shifter;

coupling the output of the multiplexer to a shift count input of the arithmetic left/right shifter;

coupling the operand to an operand input of the arithmetic left/right shifter;

shifting the operand in the arithmetic left/right shifter in a direction defined by the sign bit of N and by a shift count defined by the low-order bits;

coupling the sign bit of N to a shift input of the arithmetic left shifter;

coupling an output of the arithmetic left/right shifter to an operand input of an arithmetic left shifter; and left-shifting the output of the arithmetic left/right shifter in the arithmetic left shifter by one bit position when N is negative and not shifting the output of the arithmetic left/right shifter in the arithmetic left shifter when N is positive.

7. A method of operating a circuit to multiply or divide an operand by $2^N$, where N is an integer represented in 2's complement form, and an absolute value of N is within a maximum shift count of a first arithmetic left/right shifter, the method comprising the steps of:

selecting one of multiply and divide;

left-shifting the operand by the absolute value of N bit positions (i) when multiply is selected and N is positive, and (ii) when divide is selected and N is negative; and right-shifting the operand by the absolute value of N bit positions (i) when multiply is selected and N is negative, and (ii) when divide is selected and N is positive.

8. The method of claim 7, including:

coupling a control signal, responsive to a sign bit of N and a function signal that selects one of multiply and divide, to a shift direction input of the first arithmetic left/right shifter;

coupling low-order bits of the absolute value of N to a shift count input of the first arithmetic left/right shifter;

coupling the operand to an operand input of the first arithmetic left/right shifter; and shifting the operand in the first arithmetic left/right shifter in a direction defined by the sign bit of N and by a shift count defined by the low-order bits.

9. The method of claim 7, including:

coupling a sign bit of N to a select input of a multiplexer;

coupling N to an operand input of the multiplexer;

providing N at an output of the multiplexer when N is positive and a bit-complement of N at the output of the multiplexer when N is negative;

coupling the output of the multiplexer to a shift count input of the first arithmetic left/right shifter;

coupling a control signal, responsive to the sign bit of N and a function signal that selects one of multiply and divide, to a shift direction input of the first arithmetic left/right shifter;

coupling the operand to an operand input of the first arithmetic left/right shifter;

shifting the operand in the arithmetic left/right shifter in a direction defined by the control signal and by a shift count defined by the low-order bits;

coupling the sign bit of N to a shift count input of the second arithmetic left/right shifter;

coupling the function signal to a shift direction input of the second arithmetic left/right shifter;

coupling an output of the first arithmetic left/right shifter to an operand input of a second arithmetic left/right shifter; and left-shifting the output of the first arithmetic left/right shifter in the second arithmetic left shifter by one bit position when divide is selected and N is negative, right-shifting the output of the first arithmetic left/right shifter in the second arithmetic shifter by one bit position when multiply is selected and N is negative, and not shifting the output of the first arithmetic left/right shifter in the second arithmetic shifter when N is positive.

10. A method of operating a circuit to multiply or divide an m-bit operand by $2^N$, where N is an integer represented in 2's complement form, the method comprising the steps of:

selecting one of multiply and divide;

providing a shift count signal as low-order bits of N when N is positive and as low-order bits of a bit-complement of N when N is negative;

providing a control signal with a first logical value (i) when multiply is selected and N is positive, and (ii) when divide is selected and N is negative, and with a second logical value (i) when multiply is selected and N is negative, and (ii) when divide is selected and N is positive;

coupling the shift count signal to a shift count input of a first arithmetic left/right shifter;

coupling the control signal to a shift direction input of the first arithmetic left/right shifter;

coupling the operand to an operand input of the first arithmetic left/right shifter;

coupling a first arithmetic shifter output of the first arithmetic left/right shifter to an operand input of a second arithmetic left/right shifter;

left-shifting the operand by N bit positions in the first arithmetic left/right shifter and not shifting the first arithmetic shifter output in the second arithmetic left/right shifter when multiply is selected and N is positive and within a maximum shift count;

right-shifting the operand by an absolute value of N minus one bit positions in the first arithmetic left/right shifter and right-shifting the first arithmetic shifter output by one bit position in the second arithmetic left/right shifter when multiply is selected and N is negative and the absolute value of N is within the maximum shift count;

right-shifting the operand by N bit positions in the first arithmetic left/right shifter and not shifting the first arithmetic shifter output in the second arithmetic left/right shifter when divide is selected and N is positive and within the maximum shift count; and left-shifting the operand by the absolute value of N minus one bit positions in the first arithmetic left/right shifter and left-shifting the first arithmetic shifter output in the second arithmetic left/right shifter by one bit position when divide is selected and N is negative and the absolute value of N is within the maximum shift count.

11. The method of claim 10, wherein providing the shift count signal includes coupling N to a multiplexer that provides N at a multiplexer output when N is positive and a bit-complement of N at the multiplexer output when N is negative.

12. The method of claim 11, wherein coupling N to the multiplexer includes coupling separate bit positions of N to first input terminals of XOR gates and coupling the sign bit of N to second input terminals of the XOR gates.

13. The method of claim 11, wherein providing the shift count signal includes coupling the multiplexer output to a range detector that excludes high-order bits of the multiplexer output from the shift count signal.

14. The method of claim 13, wherein the range detector generates an overflow signal (i) when any of the high-order bits of the multiplexer output is a one and the control signal has the first logical value, and (ii) when N is negative and all the low-order bits of the multiplexer output are one's and the control signal has the first logical value.

15. The method of claim 13, wherein the range detector generates an underflow signal (i) when any of the high-order bits of the multiplexer output is a one and the control signal has the second logical value, and (ii) when N is negative and all the low-order bits of the multiplexer output are one's and the control signal has the second logical value.

16. The method of claim 15, wherein the underflow signal clears the second arithmetic left/right shifter.

17. The method of claim 10, wherein the first arithmetic left/right shifter is an m-place shifter.

18. The method of claim 10, wherein the second arithmetic left /right shifter is a 1-place shifter.

19. The method of claim 10, performed by a processor in a single instruction cycle.

20. A processor for executing the method of claim 10.

21. An apparatus for multiplying an operand by $2^N$, where N is an integer represented in 2's complement form, and an absolute value of N is within a maximum shift count of an arithmetic left/right shifter, comprising:

a logic circuit, including the arithmetic left/right shifter, that left-shifts the operand by N bit positions when N is a positive and right-shifts the operand by the absolute value of N bit positions when N is negative.

22. The apparatus of claim 21, wherein:

the logic circuit includes an absolute value generator that provides the absolute value of N; and the arithmetic left/right shifter responds to a sign bit of N at a shift direction input, lower-ordered bits of the absolute value of N at a shift count input, and the operand at an operand input.

23. The apparatus of claim 21, wherein:

the logic circuit includes a multiplexer and an arithmetic right shifter;

the multiplexer responds to N at an input and provides N at a multiplexer output when N is positive and a bit-complement of N at the multiplexer output when N is negative;

the arithmetic left/right shifter responds to a sign bit of N at a shift direction input and low-order bits of the multiplexer output at a shift count input and the operand at an operand input and provides an arithmetic left/right shifter output; and the arithmetic right shifter responds to the sign bit of N at a shift input and the arithmetic left/right shifter output at an operand input and provides the arithmetic left/right shifter output at an arithmetic right shifter output when N is positive and the arithmetic left/right shifter output right-shifted by one bit position at the arithmetic right shifter output when N is negative.

24. An apparatus for dividing an operand by $2^N$, where N is an integer represented in 2's complement form, and an absolute value of N is within a maximum shift count of an arithmetic left/right shifter, comprising:

a logic circuit, including the arithmetic left/right shifter, that right-shifts the operand by N bit positions when N is a positive and left-shifts the operand by the absolute value of N bit positions when N is negative.

25. The apparatus of claim 24, wherein:

the logic circuit includes an absolute value generator that provides the absolute value of N; and the arithmetic left/right shifter responds to a sign bit of N at a shift direction input, low-order bits of the absolute value of N at a sh operand input.

26. The apparatus of claim 24, wherein:

the logic circuit includes a multiplexer and an arithmetic left shifter;

the multiplexer responds to N at an input and provides N at a multiplexer output when N is positive and a bit-complement of N at the multiplexer output when N is negative;

the arithmetic left/right shifter responds to a sign bit of N at a shift direction input and low-order bits of the multiplexer output at a shift count input and the operand at an operand input and provides an arithmetic left/right shifter output; and the arithmetic left shifter responds to the sign bit of N at a shift input and the arithmetic left/right shifter output at an operand input and provides the arithmetic left/right shifter output at an arithmetic left shifter output when N is positive and the arithmetic left/right shifter output left-shifted by one bit position at the arithmetic left shifter output when N is negative.

27. An apparatus for multiplying or dividing an operand by $2^N$, where N is an integer represented in 2's complement form, and an absolute value of N is within a maximum shift count of a first arithmetic left/right shifter, comprising:

a logic circuit, including the first arithmetic left/right shifter, that:

left-shifts the operand by the absolute value of N bit positions (i) when multiply is selected and N is positive, and (ii) when divide is selected and N is negative; and right-shifts the operand by the absolute value of N bit positions (i) when multiply is selected and N is negative, and (ii) when divide is selected and N is positive.

28. The apparatus of claim 27, wherein:

the logic circuit includes an absolute value generator that provides the absolute value of N; and the first arithmetic left/right shifter responds to a control signal, responsive to a sign bit of N and a function signal indicative of whether multiply or divide is selected, at a shift direction input, low-order bits of the absolute value of N at a shift count input, and the operand at an operand input.

29. The apparatus of claim 27, wherein:

the logic circuit includes a multiplexer and a second arithmetic left/right shifter;

the multiplexer responds to N at an input and provides N at a multiplexer output when N is positive and a bit-complement of N at the multiplexer output when N is negative;

the first arithmetic left/right shifter responds to a control signal, responsive to a sign bit of N and a function signal indicative of whether multiply of divide is selected, at a shift direction input, low-order bits of the multiplexer output at a shift count input, and the operand at an operand input and provides a first arithmetic shifter output; and the second arithmetic left/right shifter responds to the function signal at a shift direction input and the sign bit of N at a shift count input and the first arithmetic shifter output at an operand input and provides the first arithmetic shifter output at a second arithmetic shifter output when N is positive and the first arithmetic shifter output right-shifted by one bit position at the second arithmetic shifter output when multiply is selected and N is negative and the first arithmetic shifter output left-shifted by one bit position at the second arithmetic shifter output when divide is selected and N is negative.

30. An apparatus for multiplying or dividing an m-bit operand by $2^N$, where N is an integer represented in 2's complement form, comprising:

a shift count generator that provides a shift count signal as low-order bits of N when N is positive and as low-order bits of a bit-complement of N when N is negative;

a control circuit that responds to a sign bit of N and a function signal, indicative of whether multiply or divide is selected, and provides a control signal with a first logical value (i) when multiply is selected and N is positive, and (ii) when divide is selected and N is negative, and with a second logical value (i) when multiply is selected and N is negative, and (ii) when divide is selected and N is positive;

a first arithmetic left/right shifter that responds to the shift count signal at a shift count input, the control signal at a shift direction input, the operand at an operand input, and provides a first arithmetic shifter output; and a second arithmetic left/right shifter that responds to a sign bit of N at a shift count input, the function signal at a shift direction input, the first arithmetic shifter output at an operand input, and provides a second arithmetic shifter output.

31. The apparatus of claim 30, wherein:

the first arithmetic left/right shifter left-shifts the operand by N bit positions and the second arithmetic left/right shifter does not shift the first arithmetic shifter output when multiply is selected and N is positive and N is within a maximum shift count;

the first arithmetic left/right shifter right-shifts the operand by an absolute value of N minus one bit positions and the second arithmetic left/right shifter right-shifts the first arithmetic shifter output by one bit position when multiply is selected and N is negative and the absolute value of N is within the maximum shift count;

the first arithmetic left/right shifter right-shifts the operand by N bit positions and the second arithmetic left/right shifter does not shift the first arithmetic shifter output when divide is selected and N is positive and N is within the maximum shift count; and the first arithmetic left/right shifter left-shifts the operand by the absolute value of N minus one bit positions and the second arithmetic left/right shifter left-shifts the first arithmetic shifter output by one bit position when divide is selected and N is negative and the absolute value of N is within the maximum shift count.

32. The apparatus of claim 30, wherein the shift count generator includes a multiplexer that provides N at a multiplexer output when N is positive and a bit-complement of N at the multiplexer output when N is negative.

33. The apparatus of claim 32, wherein the multiplexer includes XOR gates that receive separate bit positions of N at first input terminals and the sign bit of N at second input terminals.

34. The apparatus of claim 32, wherein shift count generator includes a range detector coupled to the multiplexer output that excludes high-order bits of the multiplexer output from the shift count signal.

35. The apparatus of claim 34, wherein the range detector generates an overflow signal (i) when any of the high-order bits of the multiplexer output is a one and the control signal has the first logical value, and (ii) when N is negative and all the low-order bits of the multiplexer output are one's and the control signal has the first logical value.

36. The apparatus of claim 34, wherein the range detector generates an underflow signal (i) when any of the high-order bits of the multiplexer output is a one and the control signal has the second logical value, and (ii) when N is negative and all the low-order bits of the multiplexer output are one's and the control signal has the second logical value.

37. The apparatus of claim 36, wherein the underflow signal clears the second arithmetic left/right shifter.

38. The apparatus of claim 30, wherein the first arithmetic left/right shifter is an m-place shifter.

39. The apparatus of claim 30, wherein the second arithmetic left/right shifter is a 1-place shifter.

40. A processor including the apparatus of claim 30.

41. An apparatus for multiplying or dividing an operand by $2^N$, where N is an integer represented in 2's complement form, comprising:

shift count means for providing a shift count signal as low-order bits of N when N is positive and as low-order bits of a bit-complement of N when N is negative;

control means that responds to a sign bit of N and a function signal, indicative of whether multiply or divide is selected, for providing a control signal with a first logical value (i) when multiply is selected and N is positive, and (ii) when divide is selected and N is negative, and with a second logical value (i) when multiply is selected and N is negative, and (ii) when divide is selected and N is positive;

first arithmetic left/right shifter means that responds to the shift count signal at a shift count input, the control signal at a shift direction input, and the operand at an operand input, for providing a first arithmetic shifter output; and second arithmetic left/right shifter means that responds to the sign bit of N at a shift count input, the function signal at a shift direction input, and the first arithmetic shifter output at an operand input, for providing a second arithmetic shifter output.

42. The apparatus of claim 41, wherein:

the first arithmetic left/right shifter means left-shifts the operand by N bit positions and the second arithmetic left/right shifter means does not shift the first arithmetic shifter output when multiply is selected and N is positive and N is within a maximum shift count;

the first arithmetic left/right shifter means right-shifts the operand by an absolute value of N minus one bit positions and the second arithmetic left/right shifter means right-shifts the first arithmetic shifter output by one bit position when multiply is selected and N is negative and the absolute value of N is within the maximum shift count;

the first arithmetic left/right shifter means right-shifts the operand by N bit positions and the second arithmetic left/right shifter means does not shift the first arithmetic shifter output when divide is selected and N is positive and N is within the maximum shift count; and the first arithmetic left/right shifter means left-shifts the operand by the absolute value of N minus one bit positions and the second arithmetic left/right shifter means left-shifts the first arithmetic shifter output by one bit position when divide is selected and N is negative and the absolute value of N is within the maximum shift count.

43. The apparatus of claim 41, including range detection means, wherein:

the range detection means generates an overflow signal with a first logical value indicative of overflow (i) when multiply is selected and N is positive and N exceeds the maximum shift count, and (ii) when divide is selected and N is negative and the absolute value of N exceeds the maximum shift count, and otherwise generates the overflow signal with a second logical value indicative of an absence of overflow; and the range detection means generates an underflow signal with a first logical value indicative of underflow (i) when multiply is selected and N is negative and the absolute value of N exceeds the maximum shift count, and (ii) when divide is selected and N is positive and N exceeds the maximum shift count, and otherwise generates the underflow signal with a second logical value indicative of an absence of underflow.

44. The apparatus of claim 41, wherein the first and second arithmetic left/right shifter means are each devoid of an array multiplier.

45. An apparatus for multiplying or dividing an operand by $2^N$, where N is an integer represented in 2's complement form, and an absolute value of N is within a maximum shift count of a left/right shifter, comprising:

a logic circuit, including the left/right shifter, that:

left-shifts the operand by the absolute value of N bit positions in a single instruction cycle when N is within the maximum shift count and (i) when multiply is selected and N is positive, and (ii) when divide is selected and N is negative; and right-shifts the operand by the absolute value of N bit positions in a single instruction cycle when N is within the maximum shift count and (i) when multiply is selected and N is negative, and (ii) when divide is selected and N is positive.

46. The apparatus of claim 45, wherein the logic circuit generates an overflow signal in a single instruction cycle when N exceeds the maximum shift count and (i) when multiply is selected and N is positive, and (ii) when divide is selected and N is negative.

47. The apparatus of claim 45, wherein the logic circuit generates an underflow signal in a single instruction cycle when N exceeds the maximum shift count and (i) when multiply is selected and N is negative, and (ii) when divide is selected and N is positive.

48. The apparatus of claim 45, wherein:

the logic circuit generates an overflow signal in a single instruction cycle when N exceeds the maximum shift count and (i) when multiply is selected and N is positive, and (ii) when divide is selected and N is negative; and the logic circuit generates an underflow signal in a single instruction cycle when N exceeds the maximum shift count and (i) when multiply is selected and N is negative, and (ii) when divide is selected and N is positive.

49. The apparatus of claim 45, wherein the left/right shifter is a logical left/right shifter.

50. The apparatus of claim 45, wherein the left/right shifter is an arithmetic left/right shifter.

51. The apparatus of claim 45, wherein the logic circuit is devoid of an array multiplier.

52. The apparatus of claim 45, wherein the logic circuit is not responsive to an externally generated shift direction signal.

53. The apparatus of claim 45, wherein the logic circuit includes another shifter with an operand input directly connected to an output of the left/right shifter.

54. The apparatus of claim 53, wherein the left/right shifter is an m-place shifter, the another shifter is a 1-place shifter, and the operand is an m-bit operand.

55. The apparatus of claim 45, wherein:

the logic circuit includes a multiplexer that receives mantissa bits of N at a first operand input and a sign bit of N at a select input; and the left/right shifter receives the operand at an operand input.

56. The apparatus of claim 55, wherein the multiplexer receives the sign bit of N at the first operand input.

57. The apparatus of claim 55, wherein the multiplexer does not receive the sign bit of N at the first operand input.

58. The apparatus of claim 55, wherein the multiplexer receives a bit-complement of the mantissa bits of N at a second operand input.

59. The apparatus of claim 55, wherein the multiplexer receives an incremented bit-complement of the mantissa bits of N at a second operand input.

60. The apparatus of claim 55, wherein the multiplexer is a 2:1 multiplexer.

61. The apparatus of claim 55, wherein the multiplexer is coupled to a shift count input of the left/right shifter.

62. The apparatus of claim 61, wherein the multiplexer is directly connected to a range detector, and the range detector is directly connected to the shift count input of the left/right shifter.

63. The apparatus of claim 62, wherein the range detector transfers low-order bits of an output of the multiplexer to the shift count input and excludes high-order bits of the output of the multiplexer from the shift count input.

64. The apparatus of claim 63, wherein:

the range detector generates an overflow signal in a single instruction cycle when N exceeds the maximum shift count and (i) when multiply is selected and N is positive, and (ii) when divide is selected and N is negative; and the range detector generates an underflow signal in a single instruction cycle when N exceeds the maximum shift count and (i) when multiply is selected and N is negative, and (ii) when divide is selected and N is positive.

65. An apparatus for multiplying or dividing an m-bit operand by $2^N$, where N is an integer represented in 2's complement form, and an absolute value of N is within a maximum shift count of an m-place arithmetic left/right shifter, comprising:

a logic circuit, including a 2:1 multiplexer and the left/right shifter, that:
- left-shifts the operand by the absolute value of N bit positions in a single instruction cycle when N is within the maximum shift count and (i) when multiply is selected and N is positive, and (ii) when divide is selected and N is negative;
- right-shifts the operand by the absolute value of N bit positions in a single instruction cycle when N is within the maximum shift count and (i) when multiply is selected and N is negative, and (ii) when divide is selected and N is positive;
- generates an overflow signal in a single instruction cycle when N exceeds the maximum shift count and (i) when multiply is selected and N is positive, and (ii) when divide is selected and N is negative; and
- generates an underflow signal in a single instruction cycle when N exceeds the maximum shift count and (i) when multiply is selected and N is negative, and (ii) when divide is selected and N is positive;

wherein mantissa bits of N are directly connected to a first operand input of the multiplexer, the operand is directly connected to an operand input of the left/right shifter, a sign bit of N controls a select input of the multiplexer, and an output of the multiplexer controls a shift count input of the left/right shifter.

66. The apparatus of claim 65, wherein the logic circuit includes a range detector, the an output of the multiplexer is directly connected to an input of the range detector, an output of the range detector is directly connected to the shift count input of the left/right shifter, the range detector transfers low-order bits of an output of the multiplexer to the shift count input, and the range detector excludes high-order bits of the output of the multiplexer from the shift count input.

67. The apparatus of claim 65, wherein the logic circuit includes a 1-place arithmetic left/right shifter with an operand input directly connected to an output of the m-place arithmetic left/right shifter.

68. The apparatus of claim 65, wherein the logic circuit includes an inverter with an operand input directly connected to the operand and an output directly connected to a second operand input of the multiplexer.

69. The apparatus of claim 65, wherein the logic circuit includes an inverter and an incrementer, an operand input of the inverter is directly connected to the operand, and output of the inverter is directly connected to an operand input of the incrementer, and an output of the incrementer is directly connected to a second operand input of the multiplexer.

70. The apparatus of claim 65, wherein the logic circuit is devoid of an array multiplier.

* * * * *